United States Patent Office 3,351,572
Patented Nov. 7, 1967

3,351,572
SOLVENT-RUBBER SYSTEMS OF
LOW VISCOSITY
Alexander K. Jameson, Elizabeth, N.J., assignor to Esso Research and Engineering Company, a corporation of Delaware
No Drawing. Filed June 30, 1964, Ser. No. 379,381
4 Claims. (Cl. 260—5)

ABSTRACT OF THE DISCLOSURE

A solvent-rubber system useful in the formulation of pressure sensitive adhesives comprises an isoparaffinic solvent and at least two co-milled rubbers wherein at least one rubber is a soluble rubber such as natural rubber, butyl rubber, polyisobutylene, ethylene-propylene rubber, etc. and at least one rubber is an insoluble rubber such as styrene-butadiene rubber, neoprene, polybutadiene, etc.

---

The present invention relates to solvent-rubber systems. In general, it concerns dispersions comprising at least two co-milled rubbers and an isoparaffinic solvent. In particular, it concerns a composition comprising a dispersion of one rubber in a medium consisting of a solution of a second rubber in an isoparaffinic solvent.

Solvent-rubber systems are employed in a wide variety of applications. Such systems are often used, for example, in adhesive formulations. In the formulation of pressure sensitive adhesives, a mixture of two or more rubbers in a suitable solvent are mixed to a homogeneous mass. The mass is then applied to a primed tape backing and the solvent is subsequently evaporated. In the formulation of pressure sensitive adhesives, as well as in many other applications, the viscosity of the solvent-rubber system is important. Since the solvent is generally the major constituent of such a system, it exerts a large influence on the viscosity of the system. In most commercial applications, the viscosity of the solvent, itself, is of minor importance. Of much greater importance is the effect of the solvent on the physical interactions of the rubber particles. The solvent-rubber systems known in the prior art have a common disadvantage. These systems exhibit increased viscosity when the rubber concentration of the system is increased. This increase in viscosity, in many instances, precludes the use of high rubber concentrations and, thereby, necessitates the use of large amounts of solvent. In addition to the disadvantage of increased solvent cost, solvent-rubber systems employing high concentrations of solvent increase the burden of solvent evaporation. An increased solvent evaporation burden necessitates either increasing the capacity of the evaporation equipment or decreasing the throughput with existing evaporation equipment. It has been found, and forms the basis of the present invention, that solvent-rubber systems employing an isoparaffinic solvent and at least two co-milled rubbers, one of which is soluble in the isoparaffinic solvent and the other of which is insoluble in the isoparaffinic solvent alone and forms a dispersion in the isoparaffinic solvent-rubber solution, have much lower viscosities for a given rubber concentration than do solvent-rubber systems of the prior art.

The solvent-rubber dispersions of the present invention are dispersions wherein the dispersion medium consists of an isoparaffinic solvent and an isoparaffinic solvent-soluble rubber. The dispersed rubber is a rubber which is insoluble in the isoparaffinic solvent alone and which has been co-milled with the soluble rubber.

Isoparaffinic solvents suitable for use in the present invention are mixtures of synthetic hydrocarbons; obtained, for example, from alkylation and fractionation processes. The isoparaffinic solvent will consist of at least 50 vol. percent isoparaffins, preferably, at least 75 vol. percent isoparaffins and, more preferably, at least 95 vol. percent isoparaffins. The remainder of the isoparaffinic solvent (i.e., in addition to the isoparaffins) will comprise primarily other saturated hydrocarbons, for example normal paraffins and naphthenic compounds. In any event, the isoparaffinic solvent will contain less than about 20 vol. percent aromatics, preferably, less than 5 vol. percent aromatics. In addition, a suitable isoparaffinic solvent will have an ASTM D–86 distillation range of from about 175 to 350° F., preferably, 200 to 220° F. It is contemplated that any isoparaffinic solvent or mixture of isoparaffinic solvents which fulfills the above requirement may be employed. A preferred isoparaffinic solvent for use in the present invention is herein identified as Isoparaffinic Solvent "C" and has the following typical inspections:

*Isoparaffinic Solvent "C"*

Typical inspections:
Distillation ° F.:
    IBP _____ 208
    5 _____ 209
    10 _____ 209
    50 _____ 211
    90 _____ 214
    95 _____ 215
    Dry point _____ 217
Flash, Tag cc., ° F. _____ 30
Hydrocarbon types, vol. percent:
    Isoparaffins _____ 99.9
    Aromatics and olefins _____ <0.1
Kauri butanol value _____ 27.3

Isoparaffinic solvent-soluble rubbers suitable for use in the solvent-rubber systems of the present invention are those rubbers which form clear or slightly hazy solutions in the isoparaffinic solvent at a concentration of about 0.1 to about 2.0 pounds of rubber per gallon of isoparaffinic solvent. Among the isoparaffinic solvent-soluble rubbers useful in the present invention are natural rubber, butyl rubber, polyisobutylene, ethylene-propylene rubber, polyisoprene, etc. Natural rubber employed in the solvent-rubber systems of the present invention usually has a "Mooney viscosity" of 30–70. Butyl rubber usually has an average molecular weight in the range of about 200,000 to 600,000 and is a copolymer of isobutylene and relatively small amounts of isoprene, such that the copolymer contains a known amount of unsaturation. Polyisobutylene usually has an average molecular weight in the range of about 800,000 to 4,000,000 and is formed by polymerizing isobutylene and is characterized by having no discernible unsaturation. Ethylene-propylene rubber usually has an average molecular weight in the range of about 100,000 to 500,000 and is a copolymer of ethylene and propylene characterized by having no discernible unsaturation. Ethylene-propylene-terpolymer usually has an average molecular weight of about 50,000 to 500,000 and is a terpolymer of ethylene, propylene, and a third monomer, present in relatively small amounts which allow conventional vulcanization by providing controlled amounts of unsaturation. Polyisoprene is a synthetic homopolymer of isoprene which may be predominantly cis-polyisoprene, trans-polyisoprene, or a polymer containing mixtures of both types of structural units. The chemical compositions and the methods of preparation of the above rubbers are well-known to those skilled in the art.

Dispersed rubbers (i.e. insoluble rubbers) suitable for use in the solvent-rubber systems of the present invention are those which are insoluble in the isoparaffinic solvent alone but which form dispersions when mixed with a solution of isoparaffinic solvent and an isoparaffinic solvent-soluble rubber. Among such rubbers are SBR, neoprene, polybutadiene, nitrile, etc.

SBR is a copolymer of styrene and butadiene, butadiene predominating; the styrene content varies from 15% to 50% depending on the desired properties. Neoprene is made by polymerizing chloroprene to yield a polymer having an average molecular weight within the range of about 20,000 to 1,000,000. Polybutadiene is a homopolymer of butadiene and may be predominantly cis-butadiene, predominantly trans-polybutadiene, or a polymer containing mixtures, depending upon the method of polymerization. Nitrile rubber is a copolymer of butadiene and acrylonitrile, butadiene predominating, usually, the butadiene content is 50% to 90%, the residue being acrylonitrile. The chemical compositions and the methods of preparation of the above rubbers are well-known to those skilled in the art.

The solvent-rubber system of the present invention comprises about 0.5 to 3.0 lbs. of rubber/gallon of solvent, preferably about 1.5 to 2.5 lbs. of rubber/gallon of solvent. The relative proportion of isoparaffinic solvent-soluble rubber to dispersed rubber will depend primarily upon the properties desired of the mixed rubber in the final application. Systems, such as the systems of the present invention, wherein there are at least two different rubbers and wherein no one rubber is present in an amount greater than ten times the amount of any other rubber present in the system, are of greatest practical importance. For example, a typical mixed rubber system will comprise a system wherein there are two different rubbers present in approximately equal amounts. The relative solubilities of the rubbers in the isoparaffinic solvent is another factor which may influence the relative proportion of isoparaffinic solvent-soluble rubber and insoluble rubber employed. For example, in a system wherein the isoparaffinic solvent-soluble rubber is natural rubber and the insoluble (dispersed) rubber is styrene-butadiene rubber of polyisobutylene, about 10 to 75 wt. percent of the rubber employed may be the insoluble rubber. When neoprene is employed as the insoluble rubber, about 10 to 60 wt. percent of the rubber employed may be neoprene. When nitrile rubber, e.g. Buna N, is used as the insoluble rubber, about 10 to 35 wt. percent of the rubber employed may be nitrile rubber. Thus, it is clear from the above, that the relative proportion of isoparaffinic solvent soluble rubber and insoluble rubber employed in the present invention are not critical provided the rubbers form a solvent-rubber dispersion.

The preparation of the solvent-rubber systems of the present invention comprises co-milling the isoparaffinic solvent-soluble rubber and insoluble rubber and subsequently mixing the co-milled rubbers with the isoparaffinic solvent hereinbefore described. The co-milling is achieved by a standard milling operation. The purpose of the co-milling operation is to break down the rubbers. For example, a suitable co-milling operation comprises co-milling 400 grams of rubber for about 3 minutes at about 150° F. on a 6" x 12" laboratory rubber mill. When natural rubber (#4 smoked sheet) is milled, a broken down rubber is produced having a "Mooney viscosity" of about 50. The mixing of the co-milled rubber and the isoparaffinic solvent may be done by any conventional method; for example, mixing may be accomplished by mechanically agitating the solvent and the co-milled rubbers in a cylindrical vessel. The resulting solvent-rubber system comprises a milky dispersion. A qualitative characterization of the particle size of the dispersed rubber may be obtained from the fact that more than 5% of the dispersed rubber settles out in 16 hours at room temperature if the viscosity of the suspension is below a critical viscosity. This critical viscosity is 8–10 poise at a shear rate of 1000 sec.$^{-1}$.

The solvent-rubber systems of the present invention may be used in many applications. It is contemplated that one of their prime uses will be in the formulation of pressure-sensitive adhesives. In such an application the system may comprise, for example, 1.5 pounds of rubber per gallon of solvent. The rubber may comprise about equal amounts of natural rubber and styrene-butadiene rubber. In many applications, other materials for example, resins and process oils may be added to the solvent-rubber system. In general, the solvent-rubber systems of the present invention will find their greatest utility in those applications where relatively high rubber concentrations and relatively low viscosities are desired.

In order to demonstrate the utility and the efficacy of the solvent-rubber systems of the present invention, several comparative tests were performed. In the first series of tests, equal weights of natural rubber and styrene-butadiene rubber (SBR 1500, containing 23.5% styrene) were sheet milled together on a 6" x 12" laboratory mill at a temperature of 150° F. for three minutes. The co-milled rubber was mixed with samples of various solvents with the rubber concentration being 1.5 pounds per gallon of solvent. Thus, the comparative examples all contained the same co-milled rubber at equal concentrations. The comparative examples differed only in the solvents employed. Viscosity-shear rate relationships were measured. The results of this series of tests are shown in Table I.

TABLE I

| Solvent | Shear Rate (sec.$^{-1}$) | Viscosity (poise) |
| --- | --- | --- |
| Isoparaffinic Solvent "C" | 441 | 13.7 |
|  | 1,480 | 8.2 |
|  | 7,160 | 3.3 |
|  | 30,600 | 1.6 |
| Toluene | 98 | 62 |
|  | 238 | 51 |
|  | 910 | 26 |
|  | 4,900 | 10 |
| Laktane, commercial solvent comprising mixed octanes (Typical Inspection: 60 vol. percent cyclo, 21 vol. percent aromatics, 19 vol. persent iso and normal). | 72 | 84 |
|  | 215 | 56 |
|  | 760 | 28 |
|  | 4,440 | 11 |
| Esso Hexane, commercial solvent comprising mixed hexanes (Typical Inspection: 40 vol. percent iso, 40 vol. percent normal, 20 vol. percent cyclo). | 185 | 31 |
|  | 581 | 21 |
|  | 2,670 | 9.2 |
|  | 14,300 | 3.4 |
| Esso Heptane, commercial solvent comprising mixed heptanes (Typical Inspection: 47 vol. percent cyclo, 27 vol. percent iso, 22.5 vol. percent normal, 3 vol. percent aromatics). | 105 | 57 |
|  | 300 | 41 |
|  | 1,200 | 20 |
|  | 6,600 | 8.4 |
| 99% n-Heptane | 191 | 31 |
|  | 629 | 19 |
|  | 2,910 | 8.2 |
|  | 16,200 | 3.0 |

The results in Table I demonstrate the unexpectedly low vsicosities obtained by the use of Isoparaffinic Solvent "C." In a second series of tests solvent-rubber systems employing (a) natural rubber and neoprene and (b) natural rubber and polybutadiene, in various solvents, were prepared and the viscosity-shear rate relationships of the systems were measured. In each test 50–50 wt. percent mixtures of co-milled natural rubber and insoluble rubber were used. The results are shown in Table II.

TABLE II

| Solvent | Rubber | Lb. rubber/ gal. solvent | Shear Rate (sec.$^{-1}$) | Viscosity (poise) |
| --- | --- | --- | --- | --- |
| Isoparaffinic Solvent "C" | 50% Natural, 50% Neoprene | 2.25 | 447 | 13.5 |
| | | | 1,227 | 9.7 |
| | | | 4,700 | 5.2 |
| | | | 22,800 | 2.1 |
| Toluene | 50% Natural, 50% Neoprene | 1.5 | 457 | 13.0 |
| | | | 1,160 | 10.2 |
| | | | 3,950 | 6.2 |
| | | | 17,500 | 2.8 |
| Isoparaffinic Solvent "C" | 50% Natural, 50% Polybutadiene | 2.25 | 57.5 | 106 |
| | | | 134 | 89 |
| | | | 409 | 57 |
| | | | 2,560 | 19 |
| Toulene | 50% Natural, 50% Polyisobutadiene | 1.5 | 53 | 115 |
| | | | 230 | 52 |
| | | | 760 | 32 |
| | | | 3,900 | 12.5 |

The results in Table II demonstrate that much higher rubber concentrations are possible by the use of Isoparaffinic Solvent "C," without increasing the viscosity of the system. In order to demonstrate the importance of co-millnig the rubbers employed in the solvent-rubber systems of the present invention, a 50/50 wt. percent mixture of the same natural rubber and styrene-butadiene rubber employed above, but without co-milling, were mixed with Isoparaffinic Solvent"C" at the same 1.5 pounds of rubber per gallon of solvent. The resulting system comprised a solution of natural rubber with lumps of the styrene-butadiene rubber on the bottom of the mixing vessel. Thus, a dispersion was not obtained. The fact that isoparaffinic solvents are far better than any other solvent from the standpoint of viscosity at equal rubber concentration is extremely interesting, especially in view of the fact that one of the components of the mixed rubber system, e.g., styrene-butadiene rubber is insoluble in isoparaffinic solvents, e.g., Isoparaffinic Solvent "C." These surprising results indicate that in a solvent-mixed rubber system, the lowest viscosity is produced by the solvent which will dissolve one rubber and be the poorest solvent for the other dispersed rubber. It will be apparent, from the above description of the present invention to those skilled in the art, that many different mixed rubbers may be employed and while the co-milled rubber in the illustrative example comprised two different rubbers, it is apparent that more than two different rubbers may be used in such systems provided at least one of the rubbers is soluble in the isoparaffinic solvent and provided that at least one of the rubbers is insoluble in the isoparaffinic solvent alone and forms a dispersion upon mixing with the isoparaffinic solvent and the isoparaffinic solvent-soluble rubber.

What is claimed is:

1. A solvent-rubber system comprising in combination an isoparaffinic solvent and at least two co-milled rubbers wherein at least one rubber is a soluble rubber selected from the group consisting of natural rubber, butyl rubber, polyisobutylene, ethylene-propylene rubber, polyisoprene, and combinations thereof and wherein a second rubber is an insoluble rubber selected from the group consisting of styrene-butadiene rubber, neoprene, polybutadiene, nitrile rubber, and combinations thereof; the total rubber concentration being in the range between about 0.5 and 3.0 pounds of rubber per gallon of said solvent and the amount of insoluble rubber accounting for 10 to 75 wt. percent of the total rubber concentration wherein the isoparaffinic solvent contains at least 95 volume percent isoparaffins and has an ASTM distillation range of about 200 to about 220° F.

2. A system defined by claim 1 wherein there are two co-milled rubbers.

3. A system as defined by claim 2 where the two co-milled rubbers are natural rubber and styrene-butadiene rubber.

4. A system as defined by claim 2 wherein the two co-milled rubbers are butyl rubber and neoprene rubber.

References Cited

UNITED STATES PATENTS 2,300,352  10/1942  Earle _____ 260—5
2,567,671   9/1951  Joesting _____ 260—5

FOREIGN PATENTS 136,543   1950   Australia.

OTHER REFERENCES

Condensed Chemical Dictionary (1961), Rose, page 624, copy in Scientific Library.

JULIUS FROME, *Primary Examiner.*